United States Patent [19]
Chari

[11] 3,816,776
[45] June 11, 1974

[54] EXTERNAL MAGNETIC FIELD COMPENSATOR

[75] Inventor: Srinivasan V. Chari, Minneapolis, Minn.

[73] Assignee: Control Data Corporation, South Minneapolis, Minn.

[22] Filed: Dec. 4, 1972

[21] Appl. No.: 311,585

[52] U.S. Cl. ............... 310/13, 310/15, 336/84
[51] Int. Cl. ............................. H02k 41/02
[58] Field of Search ........................ 336/84; 310/12–14, 15, 27

[56] References Cited
UNITED STATES PATENTS

| | | | |
|---|---|---|---|
| 2,296,754 | 9/1942 | Wolf et al. | 310/25 X |
| 2,832,903 | 4/1958 | Carter | 310/27 |
| 2,890,438 | 6/1959 | Bardeen | 310/15 X |
| 2,905,915 | 9/1959 | Harris | 336/84 X |
| 3,074,269 | 1/1963 | Wohl | 310/27 X |
| 3,470,399 | 9/1968 | Johnson et al. | 310/13 |
| 3,486,094 | 12/1969 | Zane | 310/27 X |

Primary Examiner—D. F. Duggan
Attorney, Agent, or Firm—Edward L. Schwarz

[57] ABSTRACT

An external fluctuating magnetic field may introduce errors in the signal produced by a signal winding, such as may be found in a magnetic transducer, even though the winding may be shielded by a flux shield. The subject of this invention, a compensating winding wound directly around the flux shield, can be made to produce a compensating signal which directly cancels the error component in the signal from the signal winding.

5 Claims, 4 Drawing Figures

PATENTED JUN 11 1974　　3,816,776

EXTERNAL MAGNETIC FIELD COMPENSATOR

BACKGROUND OF THE INVENTION

1. Field of the Invention

This invention will improve the performance of any winding which produces an output signal subject to error caused by an external fluctuating magnetic field. Therefore the invention is applicable to magnetic read heads, magnetic microphones, linear velocity transducers, and signal transformers, any of which must operate in a strong, fluctuating, ambient magnetic field.

2. Description of the Prior Art

No device is known which achieves the compensation performed by this invention. Perhaps the closest error reduction device is the normal flux shield which is satisfactory in many applications. A flux shield is simply a high permeability tube or shroud which encloses the signal winding, attenuating the effect of an outside varying magnetic field within the shield and preventing the inducing of an error voltage within the signal winding. However, no device is known to the inventor which actually compensates for such an error voltage. Two patents have come to the inventor's attention in which the apparatus of this invention may be advantageously employed. The subject of both U.S. Pat. Nos. 3,470,399, Johnson et al. and 3,505,544, Helms, are linear motors which employ a linear velocity transducer which measures the translation speed of the armature of the motor involved. Flux densities created in the moving armature are relatively great, the moving armature creating a varying magnetic field which may often affect the velocity transducer signal.

BRIEF DESCRIPTION OF THE INVENTION

Since this invention is an improvement to the operation of a wire coil which will be called hereafter a signal winding, placed in a varying magnetic field (hereafter, signal field) which produces a signal voltage in the signal winding, the invention must be described in conjunction with such a winding. Consider a signal transformer comprising an iron core around which are wound a primary coil and the secondary coil, the secondary coil corresponding to the signal winding. As current flow fluctuates through the primary, the magnetic field resulting will induce a voltage in a signal or secondary winding. If the transformer is located in a second fluctuating ambient magnetic field (hereafter, the external field), the signal voltage output of the signal winding will change in response to these fluctuations also, causing an error voltage to be superimposed on the signal voltage. This error voltage can be significantly reduced by placing a flux shield around the secondary winding which prevents a significant amount of the error induced by the ambient external magnetic field. It is well known, however, that a certain percentage of the flux of the external field will leak through the flux shield causing a certain amount of error voltage to be superimposed on the signal voltage in spite of the flux shield. If the external field is very strong, or if great precision is required in the signal voltage itself, the error produced by the flux leaking through the flux shield is often unacceptable. This invention comprises apparatus which further removes these error components from the signal. Briefly, the invention comprises a compensating winding or coil wound around the flux shield in which a compensation signal, attenuated by the flux shield, is produced. In some manner, the voltage of the compensation signal must be equalized with the error component of the signal winding output. This can be accomplished in a number of ways: The number of turns in the compensating winding can be adjusted to exactly balance the error component. In this case, merely connecting the signal winding and the compensating winding in series, with the polarity of the compensating signal inverted with respect to that of the error component, provides a very simple and effective equalization technique. The use of a resistance or impedance bridge combining the two signals is another means which may be employed. Still a third technique may use an amplifier receiving one signal, whose output is series connected with the winding providing the other signal.

Achievement of the equalization of the error component and the compensating signal may be done by at least two different methods. The amount of flux leakage through the flux shield may be calculated from empirical formulae, well known in the art, as a percentage of the external flux. Knowing this percentage, and that induced voltage varies directly as the number of turns in the winding in which the voltage is induced, the number of turns in the compensating winding can be determined. A simpler and more accurate method does exist, however. By allowing the external field to vary, but suppressing the signal component in the output of the signal winding, the relative voltages of the compensating winding and the error component can be quickly determined. Then, for example, the number of required turns in the compensating winding can be easily calculated, or the relative resistance values necessary in a resistance bridge can be determined, to cause the compensating signal voltage to precisely offset the error component in the signal voltage. In the signal transformer used for illustrative purposes, removing the signal input to the primary coil leaves only the error component in the signal from the secondary or signal winding.

Accordingly, one object of this invention is to passively compensate for errors induced in a signal winding by an external fluctuating magnetic field.

A second object is to inexpensively provide such an error correction.

DESCRIPTION OF THE PREFERRED EMBODIMENTS

Figure 1:
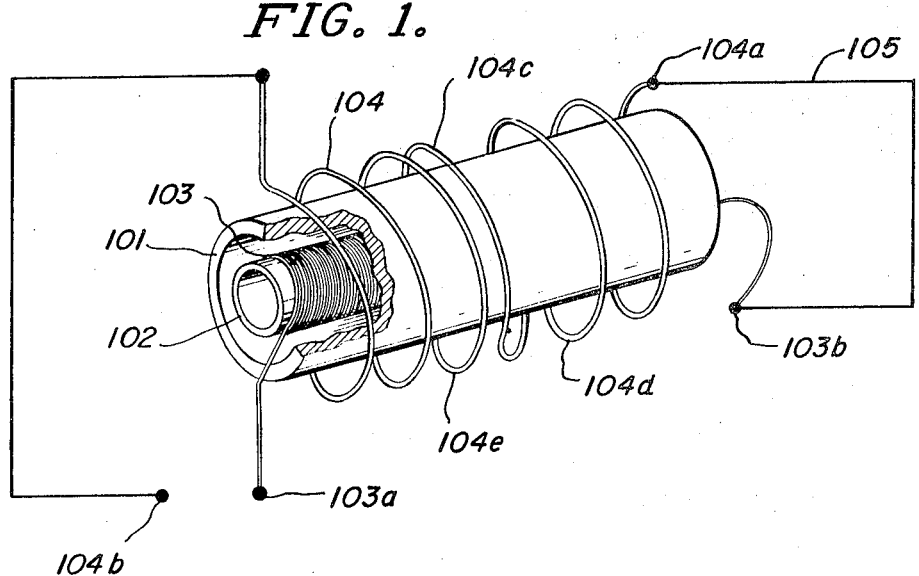
FIG. 1 is a simplified drawing of the basic invention.

Referring first to FIG. 1, the simplified embodiment shown therein comprises a signal winding 103 wound on an interior form 102. Form 102 is not essential for the functioning of the device so long as winding 103 is able to keep its predetermined shape. Form 102 is usually made from a non-magnetic material, such as plastic, but in selected applications, a magnetic material may be acceptable or even necessary. Surrounding signal winding 103 is flux shield 101, preferably extending at least the entire length of signal winding 103, and in certain applications possibly even being closed, partially or completely, at each end. Compensating winding 104 is placed so as to enclose flux shield 101 within its turns with its axis approximately parallel to that of signal winding 103. Ideally, windings 103 and 104 are coaxial, although they need not be. Preferably, the axial length of compensating winding 104 is substantially equal to the axial length of signal winding 103 and approximately coextensive therewith. By this is meant that the endmost turns of each winding are approximately coplanar with a plane perpendicular to the winding axes.

Depending on the particular means used to equalize compensating winding 104 and the error component in the signal from winding 103, the number of turns in compensating winding 104 is preselected to be a fraction of the number of turns in signal winding 102. For greatest accuracy, the turns forming compensating winding 104 are spaced along the axial length of signal winding 103 with the same proportional axial density present in signal winding 103. Let us assume that the number of turns in compensating winding 104 has been selected so that R.M.S. voltage induced in winding 104 by the fluctuating external magnetic field is substantially equal in short term magnitude, with the R.M.S. voltage of the error component (caused by external flux leaking through flux shield 101) in the signal produced by signal winding 103. In that case, one terminal of winding 104 may be connected to output terminal 103b of signal winding 103 by conductor 105. The particular terminal of winding 104 so selected depends on the "handedness" of the two windings. Winding 104 is shown as a right-hand winding. That is, it advances as a right-hand screw thread when wound as a single layer. More precisely, if current flow into a preselected end of each winding is in opposite directions (clockwise for one, counterclockwise for the other) around the axis, then the windings have opposite handedness with respect to those winding ends. Terminals of signal and compensating windings 103 and 104 of opposite handedness must be connected together. Thus, in FIG. 1, if signal winding 103 is a single layer, it must be left-handed with respect to its near end when connected as shown, in order to properly cancel the error component in the signal voltage. It should be understood that neither signal nor compensating windings 103 and 104 need by single layers.

In operation, the apparatus of FIG. 1 is assumed to be in a varying external magnetic field which may be nonuniform along the axial length of the windings. The signal field is created within flux shield 101 by any of several well known means. This signal field, as it fluctuates, cuts signal winding 103 with its lines of force and induces a signal voltage which is then presented at terminals 103a and 103b. The fluctuating signal field, as stated, may be produced in a variety of ways. One obvious means is by a primary winding whose lines of force are created by a fluctuating current within it. This, of course, is nothing more than the ubiquitous electric transformer. Another possible means of providing a varying signal field through winding 103 is to place a moving permanent magnet or DC-driven electromagnet within or adjacent winding 103. This mechanism appears in magnetic microphones and the aforementioned magnetic velocity transducers. Still a third means of creating the fluctuating signal field is by moving a magnetized strip past a magnetic core inserted in coil 103. Such a device is well known as a magnetic head, useful in playing back data recorded on a magnetic tape or disk. A portion of the magnetic field within which the apparatus of FIG. 1 is located will leak through flux shield 101, inducing thereby a second voltage in signal coil 103 which superimposes itself upon the signal voltage and forms the error component which causes the signal voltage to deviate from the exact and desired value dictated by the signal field. It has been found that it is impractical to completely eliminate this leakage of the external field through the flux shield. Compensating winding 104 provides a means for continuously and accurately measuring this external field and providing a correcting or compensating signal which may be superimposed electrically upon the signal voltage and its error component present at terminals 103a and 103b, cancelling the error component therein.

As the external field fluctuates, its lines of force cut the turns comprising winding 104, thereby inducing a voltage across terminals 104a and 104b of compensating winding 104. While it is, as stated before, almost impossible to prevent flux leakage through flux shield 101, by proper design of flux shield 101, the percentage of leakage through the flux shield can be kept relatively constant. "Proper design" includes selecting the dimensions and material of flux shield 101 to prevent its magnetic saturation, a technique well known to those having ordinary skill in this art. Without saturation of flux shield 101, a constant ratio of strength (or more precisely, flux per unit area) between the component of the external field within flux shield 101 and outside flux shield 101 exists as the external field strength varies. The voltage produced in compensating winding 104 may be made substantially equal to the error component superimposed on the signal produced by winding 103, by properly choosing the number of turns in winding 104. It is well known, that the voltage produced by a winding placed within a fluctuating magnetic field is directly proportional to the rate of change of the field strength and also directly proportional to the number of turns of the coil. Therefore, to equalize the compensating signal and the error component, the number of turns forming winding 104 must bear the same ratio to the number of turns in signal winding 103 that the flux strength of the external field component within flux shield 101 bears to its flux strength externally at compensating winding 104 itself. To express this mathematically, $$Tc = (\phi i/\phi e)(Ts)$$

where $Tc$ and $Ts$ are the number of turns on compensating and signal windings 103 and 104 respectively, and $\phi i$ and $\phi e$ are the average flux strengths of the external field inside and outside flux shield 101, respectively. As an example of the use of this equation, assume that the signal winding comprises 5,000 turns. Assume that 5% of the external flux leaks through flux shield 101 and induces an error component in the signal voltage. Then the ratio of $\phi i/\phi e = 0.05$. Then $T_c = (0.05)(5000) = 250$ turns. Thus, in this case compensating winding 104 must have 250 turns.

Several factors may allow only approximate compensation of the signal. In actuality $\phi i / \phi e$ is not a constant, but varies with change in $\phi e$, even when flux shield 101 is not saturated. The deviation from linear response is quite slight for most of the curve, however. Another factor which may affect the accuracy of the compensation is the end effect, which permits a portion of the external flux to pass through one winding without significantly affecting the signal in the other winding at all. This again is usually not significant. A third source of inexact compensation is the effect of the signal field on the compensating signal, as flux shield 101 is as easily penetrated from inside out as from outside in. The error induced thereby is very slight, however, since the signal field is also attenuated by the $\phi i/\phi e$ ration and the voltage induced thereby is in a winding (104) having comparatively few turns. Still another possible source of error is caused by any deviation of the axis of the two windings from precise parallelism to each other. However, the deviation varies in proportion to the cosine of the skew angle between the axes, and hence is very small for a small amount of non-parallelism. Experience shows that these errors will not, singly or in concert, significantly harm the compensation.

Figure 3A:
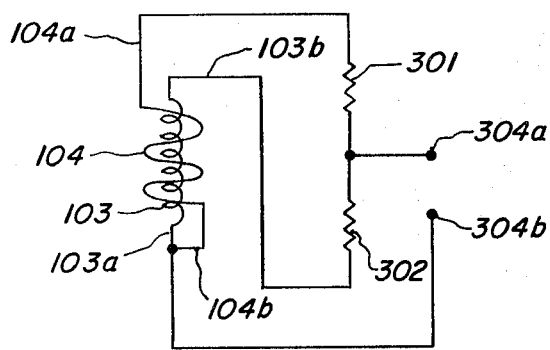
FIGS. 3a and 3b display variants equalizing the error component and the compensating signal.
Figure 3B:
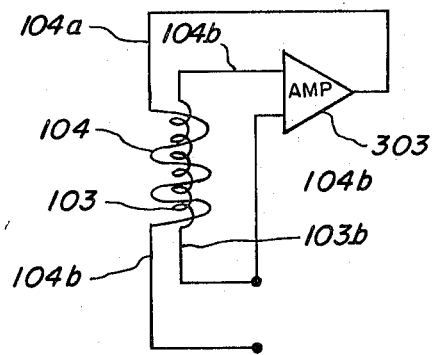

In the previous example, $\phi i / \phi e$ was given. In practice, however, it is usually necessary to determine this value experimentally. As stated earlier, this may be calculated from empirical formulae. More simply, and more accurately as well, this determination also may be made experimentally. The method requires first the disabling of whatever generates the signal field. Thus, the practitioner of this invention might disconnect current to the primary coil if a transformer was involved, or remove the magnet if winding 103 is part of a linear velocity transducer. In the case of a magnetic read head, a blank tape or disc may be run past the core. Since there will be no data component in the output of signal winding 103, only the error induced by leakage of the external field through flux shield 101 will be present. By simply comparing the voltage outputs of the signal and compensating winding 103 and 104 for a period of time, the difference in the R.M.S. values of the compensating signal and the error component may be determined. Once this difference is known, several means for equalizing these voltages may be used. One simple and effective means is merely to increase or decrease the number of turns in compensating winding 104. Assume that short term R.M.S. voltage of the signal in the compensating winding is 0.7 volts, the value in signal winding 103 over the same time with the signal component suppressed is 0.8 volts, and compensating winding 104 comprises 200 turns. Then one-seventh of the number of turns present on winding 104 must be added to it, or 28.6 turns, to equalize the voltages of the error component in winding 103 and the compensating voltage of winding 104. Other techniques, such as least square analysis, may be used for more accurate equalizing of these two signals. And in some cases, it may be preferable to equalize peak-to-peak rather than R.M.S. values. In the discussion of FIGS. 3a and 3b, two techniques for comparing the selected voltage characteristics will be described.

Figure 2:
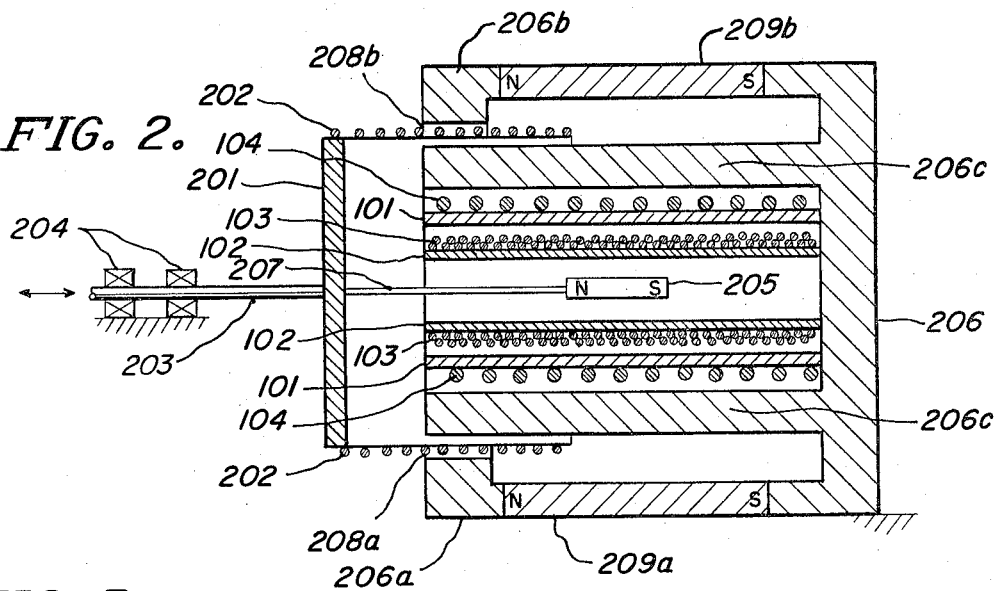
FIG. 2 is a cross-section view of the invention applied to a linear motor.

FIG. 2 discloses an operational embodiment of the invention applied to the velocity transducer in a voice coil or linear motor. Linear motor 200 comprises an iron frame 206 shown in longitudinal or axial cross section. In a section perpendicular to the axis, the device has preferably a circular and symmetric shape, each of the various elements being concentric. Frame 206 has arms 206a and 206b forming gaps 208a and 208b respectively with center cylinder 206c of frame 206. Forming part of arms 206a and 206b are permanent magnets 209a and 209b which provide a constant magnetic field across gaps 208a and 208b. Within these gaps slides cylindrically shaped armature 201, having its drive coil 202 wound around its periphery with axis substantially parallel to that of armature 201. Armature 201 is supported on shaft 203 which in turn is supported by bearings 204. Current for exciting coil 202 may be supplied by a control unit (not shown) in any convenient manner, through flexible conductors or brushes for example. Center cylinder 206c of frame 206 has a hollow cylindrical space within itself. Within center cylinder 206c, in the outermost volume of the hollow space therein, is placed compensating winding 104 wound on flux shield 101. Within flux shield 101 is signal winding 103 wound on winding form 102, which in this case must be formed of a non-magnetic material. Within form 102 permanent magnet 205 is cantilevered by beam 207, or alternatively, may slide on the interior surface of winding form 102.

In operation, signal winding 103 supplies a signal indicating the velocity of the movement of armature 201. As magnet 205 moves, its field cuts the turns of winding 103, inducing a voltage therein whose magnitude becomes increasingly greater with increasing velocity of armature 201. The current in drive coil 202 which causes movement of armature 201, is comparatively great, however, and creates a very powerful magnetic field, which, despite preventative efforts, will induce an error component in the velocity signal voltage produced by signal winding 103. As described in FIG. 1, compensating winding 104 produces a voltage which varies with speed of movement of armature 201, and its relative position in frame 206. The leakage through flux shield 101 of the magnetic field created by coil 202 can be determined experimentally as described earlier. By properly selecting the number of turns comprising compensating winding 104, the R.M.S. voltage of winding 104 can be made to almost exactly equal the R.M.S. voltage within signal winding 103 created by the field of coil 202 which leaks through flux shield 101.

FIGS. 3a and 3b describe alternative means for equalizing the R.M.S. voltage from compensating winding 104 with the error component of winding 103. In FIG. 3a, voltage output of winding 104a is made to pass through resistor 301 before reaching signal output terminal 304a. Similarly, the signal from signal winding 103 is made to pass through resistor 302 before reaching a signal output terminal 304a. Resistors 301 and 302 form a simple voltage summing circuit which equalizes the compensating signal and the error component, and sum the negative of one with the positive of the other to provide an armature velocity signal at terminals 304a and 304b which is substantially free of the error component. To use the example from before, if average compensating signal R.M.S. voltage is 0.7 volts, and the R.M.S. voltage of the error component in signal winding 103 is 0.8 volts, then the resistance of resistor 302 must bear a ratio to that of resistor 301 of 8 to 7, assuming the values of the resistors are large compared to the internal resistance of windings 103 and 104. If not, then the winding resistances must be included in the normal manner in computing the values of resistors 301 and 302.

FIG. 3b discloses another possible embodiment for equalizing the R.M.S. voltage output from compensating winding 104 with that of the error component in the signal from winding 103. The signal from winding 103 is applied to the inputs of amplifier 303. Amplifier 303 is selected to have a voltage gain greater or less than unity, which will result in the desired equalization. The output of amplifier 303 is applied to the appropriate terminal of winding 104. The terminals 103b and 104b provide the compensated output signal. Alternatively, amplifier 303 may be inserted so as to amplify the output of compensating winding 104 rather than that of signal winding 103. Of course, if all other parameters remain unchanged, then the gain of amplifier 303 must be the reciprocal, in this alternative position, of that of amplifier 303 in the circuit of FIG. 3b.

Having thus described my invention and several alternative embodiments thereto, what I claim is:

1. Apparatus for compensating for the error component in a signal voltage induced in a signal winding surrounded by a substantially coaxial high permeability flux shield, where said error component is caused by variations in a powerful external magnetic field partially leaking through the flux shield in a non-uniform fashion along its length, and comprising:
   a. a compensating winding surrounding the flux shield and approximately coaxial with the signal winding, having a predetermined percentage of the number of turns of the signal winding and producing a compensation voltage responsive to variations in the external magnetic field;
   b. an amplifier receiving the compensation voltage and having a preselected voltage gain changing the R.M.S. value of the compensation voltage by a constant percentage value to continuously approximate the R.M.S. voltage of the error component in the signal voltage; and
   c. means for superimposing the amplifier output on the signal voltage and inverted with respect to the error component in the signal voltage.

2. Apparatus for compensating for the error component in a signal voltage induced in a signal winding surrounded by a substantially coaxial high permeability flux shield, where said error component is caused by variations in a powerful external magnetic field partially leaking through the flux shield in a non-uniform fashion along its length, and comprising:
   a. a compensating winding surrounding the flux shield and approximately coaxial with the signal winding, having a predetermined percentage of the number of turns of the signal winding and producing a compensation voltage responsive to variations in the external magnetic field;
   b. an amplifier receiving the signal voltage and having a preselected voltage gain changing the R.M.S. value of the signal voltage by a constant percentage value to continuously approximate the R.M.S. voltage of the compensation voltage; and
   c. means for superimposing the compensation voltage on the amplified signal voltage and inverted with respect to the error component therein.

3. A magnetic velocity transducer for a linear motor, of the type having a signal winding within an opening in the center pole piece of the motor with its axis approximately parallel to the path of the motor's armature, and having a magnet within the signal winding mechanically shifted by the motor's armature and inducing a velocity signal voltage in the signal winding and including apparatus for compensating the velocity signal voltage for errors caused therein by varying external flux comprising:
   a. a tubular flux shield of magnetically permeable material surrounding and substantially coaxial with the signal winding and carrying magnet flux through only a portion of its length at any time;
   b. a compensating winding surrounding and approximately coaxial with the flux shield, having a fraction of the number of turns of the signal winding, and supplying a compensation voltage induced therein by the varying external magnetic field; and
   c. means for superimposing the compensation voltage on the velocity signal voltage to at least partially cancel the errors in the velocity signal voltage.

4. The apparatus of claim 3, wherein the compensating winding has a fraction of the number of signal winding turns approximately equal to the fraction of the varying external magnetic field leaking through the flux shield.

5. The apparatus of claim 3, including means for changing one of the signal and compensation voltages by a fixed percentage to approximate the other.

* * * * *